United States Patent [19]
McClure et al.

[11] Patent Number: 6,090,335
[45] Date of Patent: Jul. 18, 2000

[54] PROCESS OF FORMING FIBER REINFORCED COMPOSITE ARTICLES USING AN INSITU CURED RESIN INFUSION PORT

[75] Inventors: Edward Norman McClure, Torrance; Steven Alan Jackson, Paramount; Philip J. Sweesy, Carson, all of Calif.

[73] Assignee: Northrop Grumman Corporation, Los Angeles, Calif.

[21] Appl. No.: 09/227,461

[22] Filed: Jan. 8, 1999

[51] Int. Cl.$^7$ ................................................. B29C 43/12
[52] U.S. Cl. ........................... 264/510; 264/154; 264/257
[58] Field of Search .................. 264/510, 511, 264/154, 155, 257, 258, 102

[56] References Cited

U.S. PATENT DOCUMENTS

| | | | |
|---|---|---|---|
| 2,913,036 | 11/1959 | Smith | 154/1.6 |
| 3,146,148 | 8/1964 | Mitchella et al. | 156/382 |
| 3,861,977 | 1/1975 | Wiley | 156/242 |
| 4,132,755 | 1/1979 | Johnson | 264/553 |
| 4,280,804 | 7/1981 | Holland | 425/388 |
| 4,312,829 | 1/1982 | Fourcher | 264/571 |
| 4,359,437 | 11/1982 | Le Comte | 264/102 |
| 4,560,523 | 12/1985 | Plumley et al. | 264/102 |
| 4,676,041 | 6/1987 | Ford | 52/309.11 |
| 4,780,262 | 10/1988 | Von Volkli | 264/512 |
| 4,810,444 | 3/1989 | Alberino et al. | 264/102 |
| 4,816,106 | 3/1989 | Turris et al. | 156/285 |
| 4,824,017 | 4/1989 | Mansfield | 239/9 |
| 4,854,504 | 8/1989 | Hedger, Jr. et al. | 239/294 |
| 4,891,176 | 1/1990 | Drysdale et al. | 264/250 |
| 4,902,215 | 2/1990 | Seemann, III | 425/406 |
| 4,942,013 | 7/1990 | Palmer et al. | 264/511 |
| 4,952,358 | 8/1990 | Okina et al. | 264/134 |
| 5,000,990 | 3/1991 | Freeman | 428/36.1 |
| 5,009,821 | 4/1991 | Weaver | 264/22 |
| 5,035,602 | 7/1991 | Johnson | 425/468 |
| 5,041,260 | 8/1991 | Johnson et al. | 264/510 |
| 5,045,251 | 9/1991 | Johnson | 264/40.1 |
| 5,052,906 | 10/1991 | Seemann | 425/112 |

(List continued on next page.)

OTHER PUBLICATIONS

Abstract: E. Mcclure Notes:*Recirculation Molding* Feb. 24, 1998.

Article: Scott M. Lewit and John C. Jakabowski, Structural Composites, Inc. and Navy CECMT Marine Composites Technology Center *Recireulation Molding–Recent Advances in Applications and Equipment* pp. 1–22.

Article: Gerry Kobe *Chrysler Molds The Future* Manufacturing pp. 58–60 Nov. 1997.

*Primary Examiner*—Jan H. Silbaugh
*Assistant Examiner*—Stefan Staicovici
*Attorney, Agent, or Firm*—Terry J. Anderson; Karl J. Hoch, Jr.

[57] ABSTRACT

A process is provided for forming a fiber-reinforced resin structure having an opening therein by vacuum bag forming. A resin infusion port is disposed adjacent a mold surface. The resin infusion port has a resin inlet and at least one resin outlet. A fiber-reinforced ply is distributed adjacent the mold surface about the resin infusion port. A flexible covering is placed over the fiber-reinforced ply and the mold surface to form a chamber therebetween. The chamber is evacuated. Resin is dispensed into the resin infusion port through the resin inlet. The resin is infused into the ply by dispensing resin into the chamber from the resin infusion port through the resin outlet. The resin is cured within the resin infusion port and within the chamber to form a cured resin structure which is subsequently removed from the mold surface. An opening is formed in the resin structure by removing the resin infusion port and a portion of the resin structure adjacent the resin infusion port.

3 Claims, 3 Drawing Sheets

U.S. PATENT DOCUMENTS

| | | | |
|---|---|---|---|
| 5,096,651 | 3/1992 | Le Comte | 264/510 |
| 5,132,069 | 7/1992 | Newton | 264/257 |
| 5,141,690 | 8/1992 | Marshall | 264/154 |
| 5,169,571 | 12/1992 | Buckley | 264/22 |
| 5,183,619 | 2/1993 | Tolton | 264/257 |
| 5,215,322 | 6/1993 | Enders | 280/231 |
| 5,242,651 | 9/1993 | Brayden et al. | 264/510 |
| 5,266,139 | 11/1993 | Yokota et al. | 156/169 |
| 5,275,372 | 1/1994 | Boeckeler | 249/134 |
| 5,281,388 | 1/1994 | Palmer et al. | 264/571 |
| 5,298,212 | 3/1994 | Stecker | 264/571 |
| 5,316,462 | 5/1994 | Seemann | 425/112 |
| 5,322,665 | 6/1994 | Bernardon et al. | 264/571 |
| 5,388,768 | 2/1995 | Moses | 239/417 |
| 5,403,537 | 4/1995 | Seal et al. | 264/511 |
| 5,407,610 | 4/1995 | Kohama et al. | 264/22 |
| 5,417,899 | 5/1995 | Kitamura | 264/40.5 |
| 5,432,010 | 7/1995 | Ko et al. | 428/542.8 |
| 5,439,635 | 8/1995 | Seemann | 264/510 |
| 5,480,603 | 1/1996 | Lopez et al. | 264/131 |
| 5,484,277 | 1/1996 | Lindsay | 425/388 |
| 5,500,164 | 3/1996 | Livesay et al. | 264/459 |
| 5,516,271 | 5/1996 | Swenor et al. | 425/127 |
| 5,527,414 | 6/1996 | Dublinksi et al. | 156/245 |
| 5,540,497 | 7/1996 | Addeo et al. | 366/159.1 |
| 5,549,246 | 8/1996 | Kukesh | 239/9 |
| 5,576,030 | 11/1996 | Hooper | 425/112 |
| 5,588,392 | 12/1996 | Bailey | 114/357 |
| 5,639,027 | 6/1997 | Fritz | 239/414 |
| 5,641,525 | 6/1997 | Yakel | 425/390 |
| 5,665,301 | 9/1997 | Alanko | 264/571 |
| 5,678,591 | 10/1997 | Merrifield et al. | 137/208 |
| 5,702,663 | 12/1997 | Seemann | 264/510 |
| 5,721,034 | 2/1998 | Seemann, III et al. | 428/71 |
| 5,733,494 | 3/1998 | Moore | 264/258 |
| 5,741,450 | 4/1998 | Monroe | 264/102 |
| 5,885,513 | 3/1999 | Louderback et al. | 264/459 |
| 5,919,327 | 7/1999 | Smith | 156/245 |
| 5,939,013 | 8/1999 | Han et al. | 264/510 |

PROCESS OF FORMING FIBER REINFORCED COMPOSITE ARTICLES USING AN INSITU CURED RESIN INFUSION PORT

FIELD OF THE INVENTION

The present invention relates generally to fiber-reinforced resin structures, and more particularly to a process of fabricating a fiber-reinforced resin structure using a resin infusion port which is cured in place.

BACKGROUND OF THE INVENTION

Vacuum assisted resin transfer molding (VARTM) and related processes and techniques have been widely used to fabricate relatively large fiber-reinforced composite articles. Such articles may include coach chassis for buses and trailers and fiber glass boat hulls, for example.

In general, the VARTM process includes the distribution of dry, fiber strips, plies or mats about the surface of a female mold to form a fiber lay-up of a desired thickness. The fiber strips or plies may take the form of a cloth or sheet of fibers of glass, carbon or other suitable material. In addition, one or more rigid core layers may be included. The core layers may be formed of a solid foam material or balsa wood. The core layers may be sandwiched between the fiber plies to form a fiber/core composite lay-up or laminate.

A flexible, fluid impermeable bag or sheet is positioned atop the exposed lay-up and sealed about the periphery thereof. A relative vacuum is drawn between the mold and the bag, thereby causing the bag to compress against the fiber lay-up. A chemically catalyzed liquid resin is introduced into the evacuated bagged mold through a series of resin supply lines or conduits. A multitude of individual resin supply lines may be used so as to facilitate distributed wetting or infusion of the liquid resin about the fiber lay-up. The vacuum source and resin supply lines are strategically positioned relative to one another in a manner which encourages controlled wetting. In this respect, the vacuum source may be applied at one side of the fiber lay-up and the resin introduced at an opposing side, and thus tending to cause the resin to be pulled across and wet portions of the fiber lay-up therebetween.

Underwetting and overwetting of the fiber lay-up are particularly problematic, as such conditions may result unacceptable structural weaknesses and deficiencies of the resultant article. In addition, nonuniform resin distribution may also result unacceptable structural weaknesses and deficiencies of the resultant article.

Contemporary techniques for facilitating more uniformed or homogeneous resin distribution include the use of cloth material adjacent the fiber lay-up. The cloth forms a screen or matrix of open spaces which tends to wick the resin, and thereby facilitates resin flow. The cloth is removed or peeled away prior to the resin fully curing. Other techniques for enhancing more uniformed resin distribution focus on the resin delivery apparatus, such as specially formed resin supply conduit manifolds and manifolds which are integrated into the vacuum bag itself. While these and other techniques enhance the distribution of resin about the fiber lay-up, they each require the positioning and application of a particular type of cloth or conduit manifold or the like, each time the article is formed. In addition, specialized procedures for disposal and/or clean-up of such additional apparatus must be addressed as well. As such, use of such apparatus increases the time and skill requirements in order to fabricate a resultant article to desired quality control standards.

Where resin overwetting is detected prior to the resin curing, excess resin may be removed via skilled labor intensive steps. Where underwetting is detected in a cured lay-up, the structure may be required to undergo additional processing in the form of reinfusion of liquid resin and subsequent curing of the resin. While such labor intensive steps, including inspection tasks, may be result in a structure which conforms to desired mechanical requirements, such a process so limits the production efficiency so as to make the process economically nonfeasible.

As such, based upon the foregoing, there exists a need in the art for an improved method and device, for enhancing resin distribution in comparison to the prior art.

SUMMARY OF THE INVENTION

In accordance with the present invention, there is provided a process for forming a fiber-reinforced resin structure having an opening therein by vacuum bag forming. A resin infusion port is disposed adjacent a mold surface. The resin infusion port has a resin inlet and at least one resin outlet. A fiber-reinforced ply is distributed adjacent the mold surface about the resin infusion port. A flexible covering is placed over the fiber-reinforced ply and the mold surface to form a chamber therebetween. The chamber is evacuated. Resin is dispensed into the resin infusion port through the resin inlet. The resin is infused into the ply by dispensing resin into the chamber from the resin infusion port through the resin outlet. The resin is cured within the resin infusion port and within the chamber to form a cured resin structure which is subsequently removed from the mold surface. An opening is formed in the resin structure by removing the resin infusion port and a portion of the resin structure adjacent the resin infusion port.

An example of an opening being required to be formed in a fiber-reinforced resin structure is at the wheel well portion of a bus coach lower chassis for extension of a shock absorber and other structural supports or linkages therethrough. A typical method of forming such an opening is to form a fiber-reinforced resin structure in whole, and subsequently drill or cut an opening therein at the desired location. The method of the present invention for fabricating fiber-reinforced resin structures having an opening formed therein presents numerous advantages not found in the related prior art. The present method incorporates or integrates the infusion port into the structure itself, thereby facilitating direct infusion or distribution of liquid resin into and about the adjacent fiber-reinforced plies. In this respect, the present invention is particularly adapted to provide enhanced resin distribution by use of a cured in place or insitu resin infusion port. Such enhanced resin distribution tends to increase the structural integrity of the resultant fiber-reinforced resin structures. This is particularly advantageous as such locations are typically highly susceptible to the development of stress concentrations thereat. In addition, because the present method enhances resin distribution, the time and skill requirements to fabricate the resultant fiber-reinforced structure is reduced. As such, the resultant structures can be produced at rates which make the technology more economically viable.

As such, the present invention represents an advance in the art.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
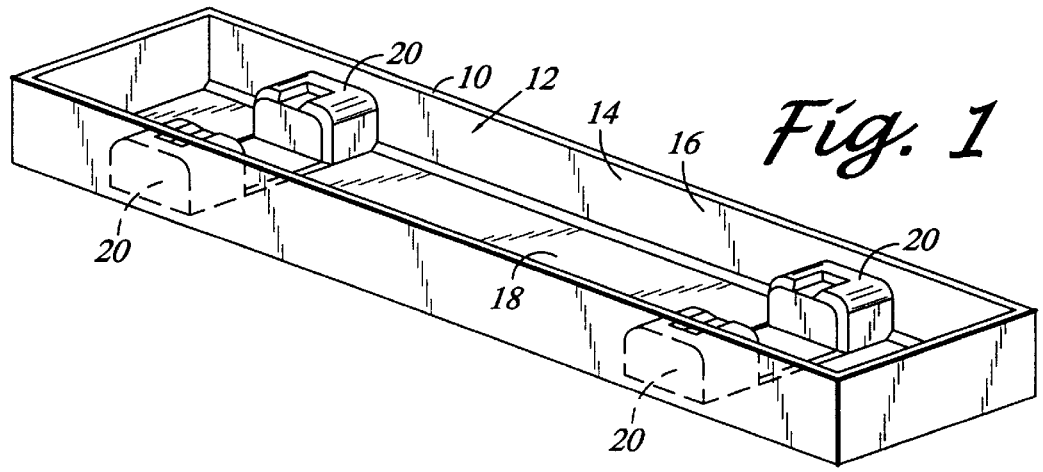
FIG. 1 is a perspective view of a mold for use in conjunction with the process of the present invention.

Referring now to the drawings wherein the showings are for purposes of illustrating a preferred embodiment of the present invention only, and not for purposes of limiting the same, FIGS. 1–7 illustrate a process for forming a fiber-reinforced resin structure having an opening therein by vacuum bag forming.

Referring now to FIG. 1, there is depicted a mold 10 which is used to fabricate fiber-reinforced resin structures. The mold 10 defines a mold cavity 12 and having a mold surface 14. The mold 10 is sized and configured to conform to the shape of desired resultant product. In this respect, the mold 10 is symbolically representative. The mold 10 is depicted to conform to the geometry of a bus lower chassis and is therefore provided with wall, floor and wheel well portions 16, 18, 20. As such, it is observed that the mold surface 14 has regions which are aligned to be horizontal, vertical and at other angular orientations. Further, it is contemplated that the mold surface 14 may have generally planar portions as well as those which or curved or irregularly shaped.

Figure 2:
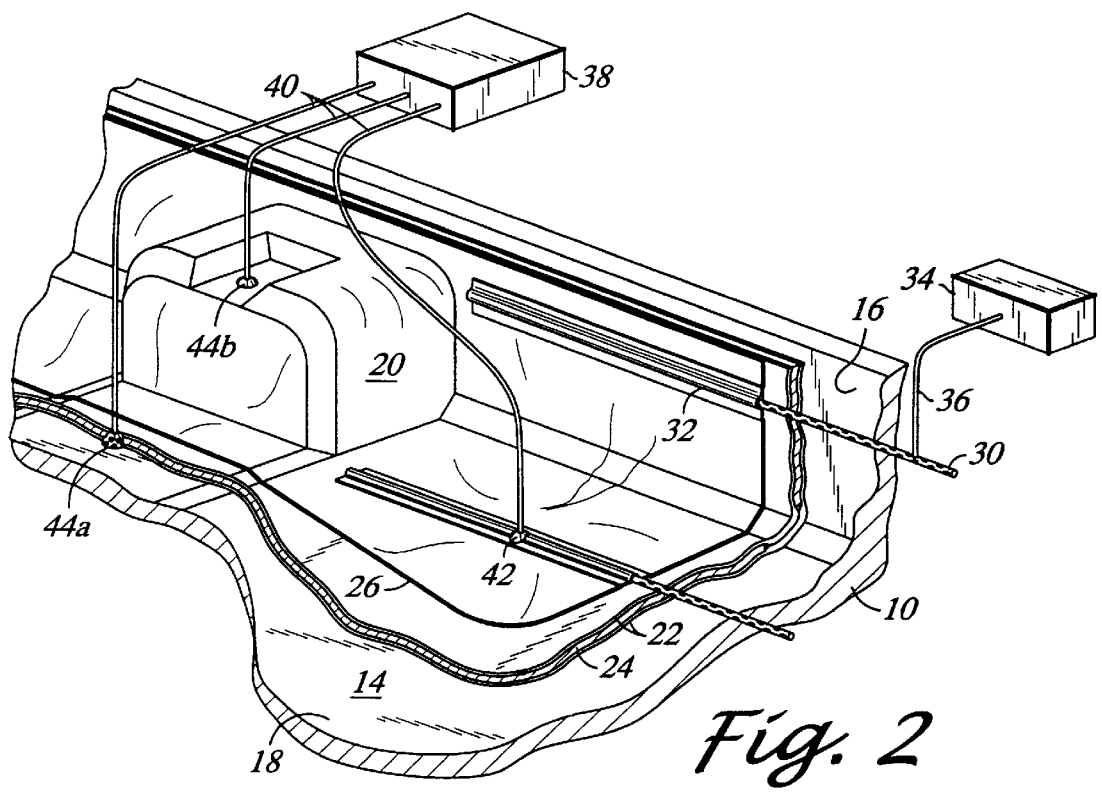
FIG. 2 is a enlarged perspective view of a portion of the mold of FIG. 1 shown with a bagged fiber-reinforced lay-up and resin infusion ports used in conjunction with the process of the present invention.

In general, referring now to FIG. 2, the VARTM process of forming fiber-reinforced resin structures typically begins with the distribution of fiber-reinforced plies 22 and core material 24 about the mold surface 14. The fiber-reinforced plies 22 take the form of a cloth or sheet of fibers of glass, carbon or other suitable materials which are well known to one of ordinary skill in the art. In addition, as further discussed below, one or more rigid core layers 24 may be included. The core layers 24 may be formed of a solid foam material, balsa wood or other suitable materials which are well known to one of ordinary skill in the art. The core layers 24 may be sandwiched between the fiber-reinforced plies 22 to form a fiber/core composite lay-up or laminate. Where the core layers 24 are not included, the fiber-reinforced plies 22 form a solid fiber or solid glass section thereat. The fiber-reinforced plies 22 and core layers 24 are applied to a desired thickness. It is contemplated that the mold 10 and mold surface 14 are of such structural integrity so as to be supportive the fiber-reinforced plies 22 and core layers 24.

The typical VARTM process further provides for a flexible, fluid impermeable bag or covering 26 is positioned atop the topmost fiber-reinforced ply 22. The periphery of the covering 26 is sealed against the mold surface 14 thereby bagging the fiber-reinforced plies 22 and core layers 24 therein. As such, a chamber 28 is formed between the covering 26 and the mold surface 14. A relative vacuum is drawn within the chamber 28 (i.e., between the mold 10 and the covering 26), thereby causing the covering 26 to compress and collapse against the fiber lay-up, according to those methods which are well known to one of ordinary skill in the art. In this respect, vacuum conduits 30 may be selectively distributed about the mold 10. The vacuum conduits 30 may be disposed through the covering 26 or at the periphery thereof and sealed therewith via vacuum manifold 32. The vacuum conduits 30 are in vacuum communication with a vacuum source 34 and supporting vacuum lines 36.

A chemically catalyzed liquid resin is pumped from a resin source 38 through a series of resin supply lines 40 which are selectively distributed about the mold 10. A multitude of individual resin supply lines 40 may be used so as to facilitate distributed wetting or infusion of the liquid resin about the fiber reinforced plies 22. The resin, resin supply lines 40 and supporting pumping apparatus are contemplated to be chosen from those which are well known to one of ordinary skill in the art. As is typical in the art, some of the resin supply lines 40 terminate at a topically-mounted resin delivery apparatus 42. The topically-mounted resin delivery apparatus 42 may be disposed through the covering 26 or at the periphery thereof and in sealed communication therewith according to those methods which are well known to one of ordinary skill in the art.

According to the method of the present invention, a resin infusion port 44 is disposed adjacent the mold surface 14. The resin infusion port 44 has an resin inlet 46 for receiving resin therethrough and at least one resin outlet 48 for dispensing resin therethrough. As is more fully discussed below, there are preferably provided multiple resin outlets 48 distributed about the resin infusion port 44. The vacuum conduits 30, the topically-mounted resin delivery apparatus 42 and the resin infusion port 44 are strategically and cooperatively positioned relative to one another in a manner which encourages controlled resin wetting. In this respect, the vacuum ports 32 may be applied at one portion of the mold 10 and the topically-mounted resin delivery apparatus 42 at another portion. The relative positioning of the vacuum ports 32 and the topically-mounted resin delivery apparatus 42 tends to cause the dispensed liquid resin to be pulled across and wet portions of the fiber-reinforced plies 22 therebetween.

As shown in FIG. 2, a resin infusion port 44a is disposed adjacent the floor portion 18 of the mold 10 and another resin infusion port 44b is disposed adjacent the wheel portion 20 of the mold 10. The fiber-reinforced plies 22 may be interleaved with one or more core layers 24 such as is depicted adjacent the floor portion 18 of the mold 10. It is also contemplated that the fiber-reinforced plies 22 may not be accompanied by any core layers 24 as may be the case adjacent the wheel well portion 20 of the mold 10. As such, the resin infusion ports 44 may be disposed adjacent fiber-reinforced plies 22 having or not having any core layers 24.

Figure 3:
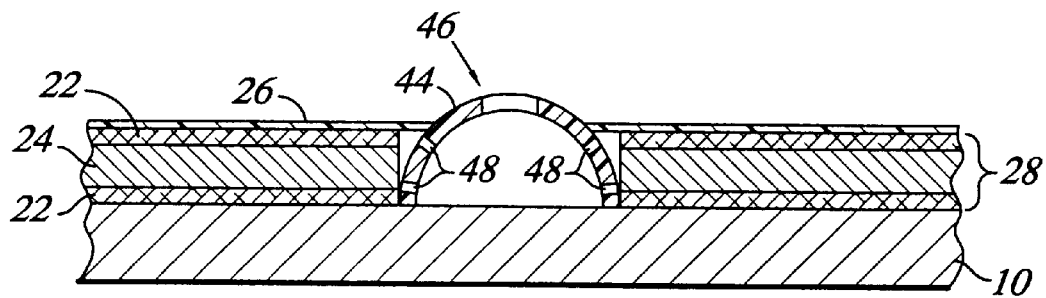
FIG. 3 is a cross-sectional view of the bagged mold and resin infusion port of the present invention
Figure 4:
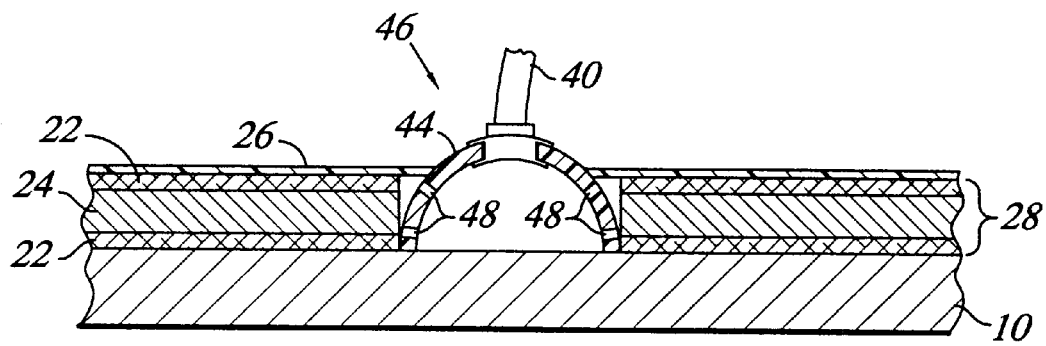
FIG. 4 is a cross-sectional view of the bagged mold of FIG. 3 shown with a resin supply hose.
Figure 5:
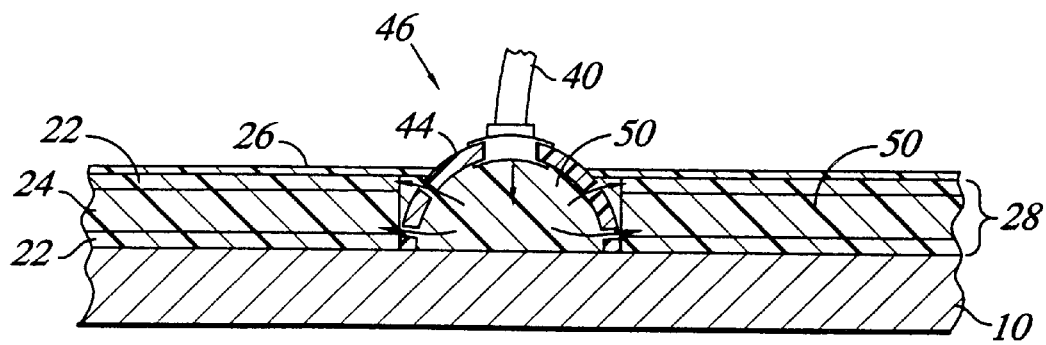
FIG. 5 is a cross-sectional view of the bagged mold of FIG. 4 shown with resin being infused into fiber-reinforced lay-up.

Referring now to FIG. 3, the resin infusion port 44 preferably takes the form of a cap-like structure and is generally defined by a central axis of symmetry which extends through the resin inlet 46. The resin outlets 48 are formed to extend from the central axis and radially distributed thereabout. The resin infusion port 44 is sized and configured such that central axis is disposed orthogonal to the mold surface 14. In addition, the resin outlets 48 may be variably distributed along the central axis such that the resin outlets are differentially displaced from the adjacent mold surface 14. Such variable distribution of the resin outlets 48 is contemplated to align the resin outlets adjacent different portions of the fiber/core lay-up (i.e., fiber-reinforced plies 22 and core layers 24). The variable distribution of the resin outlets 48 facilitates ease of resin distribution to selective fiber-reinforced plies 22. In this regard, referring now to FIGS. 4 and 5, a resin supply line 40 is engaged with the resin inlet 46. The resin supply line 40 and resin inlet 46 are cooperatively formed to facilitate such engagement. The chamber 28 formed between the covering 26 and the mold surface 14 is evacuated. Resin 50 is pumped from the supply line 40 through the resin inlet 46 into the resin infusion port 44. The resin 50 is consequently dispensed therefrom through the resin outlets 48 and into and about the chamber 28. As such, the resin 50 is infused into the adjacent fiber-reinforced plies 22. Upon sufficient wetting or infusion of the adjacent plies 22, the pumping of the resin 50 is ceased and the resin supply line 40 is disengaged from the resin infusion port 44.

Figure 6:
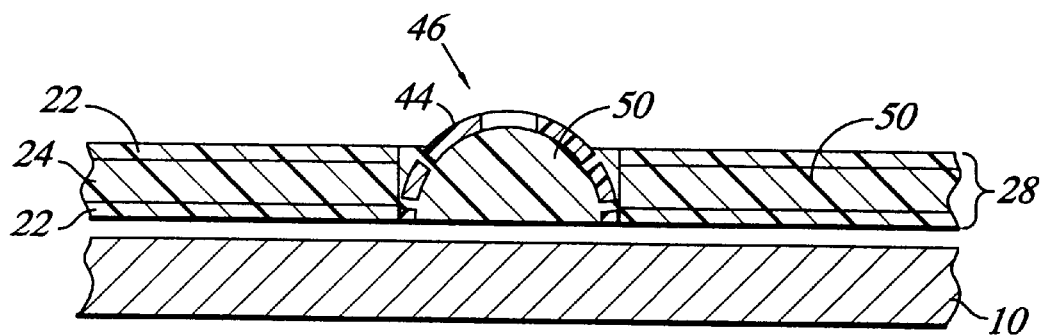
FIG. 6 is a cross-sectional view of the mold of FIG. 5 shown with a resultant cured fiber-reinforced lay-up after being removed from the mold.
Figure 7:
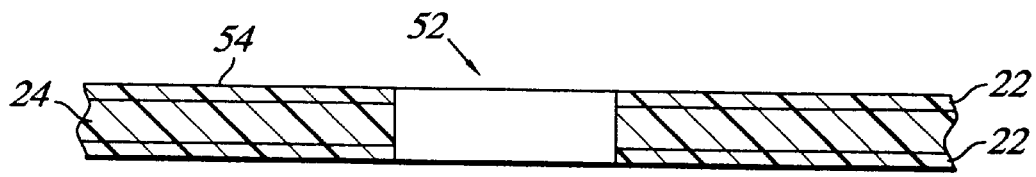
FIG. 7 is a cross-sectional view of the cured fiber-reinforced lay-up after having an opening formed therein.

Referring now to FIG. 6, the infused fiber-reinforced plies 22 and core layer 24 are allowed to cure according to those methods which are well known to one of ordinary skill in the art. The resin infusion port 44 is thus secured in place or insitu relative to the fiber-reinforced plies 22 and core layer 24. After the plies 22 have cured, the resultant fiber-reinforced resin structure 54 is removed from the mold 10. It is contemplated that in order to facilitate ease of such removal, a gelcoat of suitable material known to those of ordinary skill in the art may be applied to the mold 10. Upon removal the cured fiber-reinforced structure 54 from the mold 10, an opening 52 is formed therein by cutting or otherwise machining that portion of the fiber-reinforced structure 54 surrounding the insitu resin infusion port 44, as depicted in FIG. 7. Subsequently, it is contemplated that the resin infusion port 10 may be simply discarded as waste material. As such the resin infusion port 44 may be formed of a relatively inexpensive molded plastic material. It is contemplated, however, the resin infusion port 44 may be cleaned of cured resin 50 and any remaining fragments of the fiber-reinforcement plies 22 and/or core layer 24 for later reuse.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A process for forming a fiber-reinforced resin structure having an opening therein by vacuum bag forming comprising:

(a) placing a resin infusion port adjacent a mold surface, the resin infusion port having a resin inlet, a central axis of symmetry extending through the resin inlet and disposed generally orthogonal to the mold surface and multiple resin outlets radially distributed about the central axis of symmetry and disposed at variable positions along the central axis differentially displaced from the adjacent mold surface;

(b) distributing a fiber-reinforced ply adjacent the mold surface around the resin infusion port;

(c) placing a flexible covering over the fiber reinforced ply and the mold surface to form a chamber therebetween;

(d) evacuating the chamber;

(e) dispensing resin into the resin infusion port throught the resin inlet;

(f) infusing the ply with resin by dispensing resin into the chamber from the resin infusion port through the multiple resin outlets;

(g) curing the resin within the resin infusion port and within the chamber to form a cured resin structure;

(h) removing the cured resin structure from the mold surface; and (i) forming an opening in the resin structure by removing the resin infusion port and a portion of the resin structure adjacent the resin infusion port.

2. The process of claim 1 wherein step (b) further comprises distributing a core material adjacent the fiber-reinforced ply.

3. The process of claim 2 wherein the multiple resin outlets are aligned relative to the core material.

* * * * *